Patented June 24, 1930

1,765,661

UNITED STATES PATENT OFFICE

WILHELM ECKERT AND HEINRICH GREUNE, OF HOCHST-ON-THE MAIN, GERMANY, ASSIGNORS TO GENERAL ANILINE WORKS, INC., OF NEW YORK, N. Y., A CORPORATION OF DELAWARE

DERIVATIVES OF 1.4.5.8 NAPHTHALENETETRACARBOXYLIC ACIDS AND PROCESS OF PREPARING THEM

No Drawing. Application filed January 27, 1927, Serial No. 164,125, and in Germany February 9, 1926.

Our present invention relates to derivatives of 1.4.5.8-naphthalenetetracarboxylic acid and a process of preparing them.

We have found that by causing ortho-diamines to act upon the dianhydride of 1.4.5.8-naphthalenetetracarboxylic acid or upon the free acid in a solvent of a low boiling point, such as alcohol or the like, intermediate products are obtained the constitution of which is not exactly known.

Now we have made the observation that the said intermediate products can be converted into valuable vat dyestuffs by heating them to boiling in a dry state alone or in a solvent of a high boiling point.

The following example illustrates our invention but is not meant to limit the invention thereto; the parts being by weight:

10 parts of the dianhydride of 1.4.5.8-naphthalenetetracarboxylic acid are heated to boiling on the reflux condenser in 50 parts of alcohol with 8 parts of ortho-phenylenediamine. After some hours, the mass is filtered by suction, washed with alcohol until the alcohol running off becomes colorless and then dried. The intermediate product thus obtained forms a brownish mass which, on addition of concentrated hydrochloric acid, yields a yellow sparingly soluble hydrochloride. Said brownish mass dissolves in concentrated sulfuric acid to a yellowish-brown solution which when poured on water remains clear golden-yellow. It gives a wine-red leuco compound and dyes cotton very weak orange tints. The intermediate product has probably the formula:

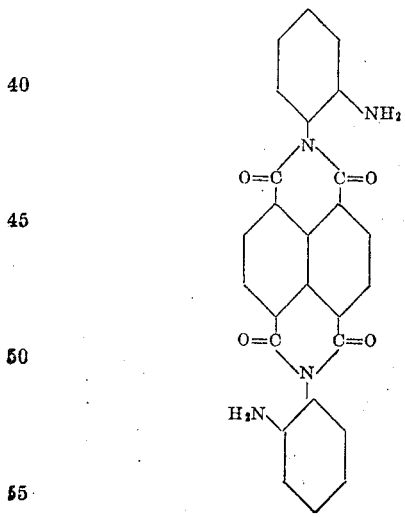

10 parts of the condensation product thus obtained are introduced into glacial acetic acid, and the whole is then heated to boiling. After a short time the mass assumes an intensely red coloration and the dyestuff separates. The latter is then filtered by suction, washed with water and dried. It forms a red powder which dissolves in concentrated sulfuric acid to a yellowish-brown solution and gives a green vat which dyes cotton on exposure to the air a brilliant red tint. The vat dyestuff has most probably one of the following formulæ:

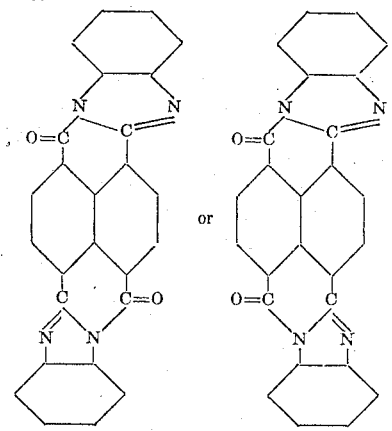

Instead of treating the intermediate product in glacial acetic acid, it may also be heated alone in a dry state to about 150° C. whereby it becomes deep-red and eliminates water. Instead of glacial acetic acid, any other solvent or diluent of a high boiling point may be used.

In the following claims we understand by the term "1.4.5.8-naphthalenetetracarboxylic acid compound" not only this acid itself, but also its anhydride and by the term "an ortho-diamine" we understand also the salts of it. The heating operation mentioned in the claims may be carried out by heating the products in a dry state alone or in a solvent of a high boiling point.

We claim:

1. The process of making vat dyestuffs which comprises heating at a temperature of about 150° C. a compound obtainable by reacting an orthodiamine with a 1.4.5.8-naphthalene tetracarboxylic acid compound in the presence of a diluent at a temperature below 100° C.

2. The process of making vat dyestuffs which comprises heating in the presence of a diluent at a temperature of about 150° C. a compound obtainable by reacting an ortho-diamine with a 1. 4. 5. 8.-naphthalene tetra-carboxylic acid compound in the presence of a diluent at a temperature below 100° C.

3. The process of making vat dyestuffs which comprises heating at a temperature of about 150° C. a compound of the formula:

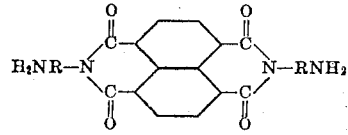

wherein $RNH_2$ represents an aminoaryl radical having the amino group adjacent to the R—N linkage.

4. The process of making vat dyestuffs which comprises heating in the presence of a diluent at a temperature of about 150° C. a compound of the formula:

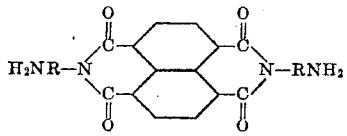

wherein $RNH_2$ represents an aminoaryl radical having the amino group adjacent to the R—N linkage.

5. The process of making vat dyestuffs which comprises heating at a temperature of about 150° C. a compound of the formula:

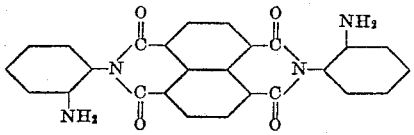

6. The process of making vat dyestuffs which comprises heating in the presence of a diluent at a temperature of about 150° C. a compound of the formula:

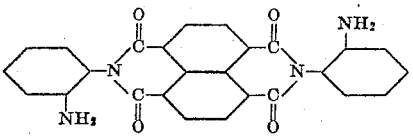

In testimony whereof, we affix our signatures.

Dr. WILHELM ECKERT.
HEINRICH GREUNE.